US006461551B1

(12) United States Patent
Mandish

(10) Patent No.: US 6,461,551 B1
(45) Date of Patent: Oct. 8, 2002

(54) VACUUM MOLDING PROCESS

(76) Inventor: Theodore O. Mandish, 5055 State Road 46, Mims, FL (US) 32754

( * ) Notice: Subject to any disclaimer, the term of this patent is extended or adjusted under 35 U.S.C. 154(b) by 0 days.

(21) Appl. No.: 09/346,386

(22) Filed: Jul. 1, 1999

Related U.S. Application Data

(62) Division of application No. 08/723,183, filed on Sep. 27, 1996, now Pat. No. 5,932,256.

(51) Int. Cl.[7] ............................ B28B 1/08; B29C 43/22
(52) U.S. Cl. .......................................... 264/71; 264/102
(58) Field of Search .................................... 264/71, 102

(56) References Cited

U.S. PATENT DOCUMENTS

| | | | |
|---|---|---|---|
| 995,690 A | | 6/1911 | Landis |
| 2,046,867 A | * | 7/1936 | Billner |
| 2,129,240 A | | 9/1938 | Sanborn |
| 2,173,593 A | | 9/1939 | Phelps |
| 2,281,133 A | | 4/1942 | Abercrombie |
| 2,386,961 A | | 10/1945 | Lake |
| 2,529,500 A | | 11/1950 | Johnson |
| 2,603,850 A | | 7/1952 | Dubbs et al. |
| 2,610,040 A | | 9/1952 | Emmons |
| 2,628,402 A | | 2/1953 | Bilner |
| 2,636,539 A | | 4/1953 | Pajak |
| 3,323,188 A | | 6/1967 | Abbott |
| 3,712,785 A | | 1/1973 | Hirt et al. |
| 3,813,068 A | | 5/1974 | Binsfeld |
| 4,796,686 A | | 1/1989 | Gayso |
| 4,990,082 A | | 2/1991 | Lee |
| 5,217,664 A | | 6/1993 | Feichtinger |
| 5,366,684 A | | 11/1994 | Corneau, Jr. |
| 5,540,576 A | | 7/1996 | Kawakita et al. |
| 5,665,301 A | | 9/1997 | Alanko |
| 5,968,445 A | * | 10/1999 | McCarville et al. ........ 264/571 |
| 6,033,203 A | * | 3/2000 | Christensen et al. ..... 425/174.2 |

FOREIGN PATENT DOCUMENTS

| | | |
|---|---|---|
| GB | 365290 | 9/1938 |
| GB | 503603 | 9/1938 |
| GB | 135397 | 12/1961 |

* cited by examiner

*Primary Examiner*—Christopher A. Fiorilla
(74) *Attorney, Agent, or Firm*—William M. Hobby, III

(57) ABSTRACT

A vacuum molding process includes selecting a flexible polymer cover for covering a selected cement container and at least partially filling the container with a cement mixture. The polymer cover is removably attached to the partially filled cement container and a vacuum is applied to the cement mixture in the container. The process may also include connecting a vibrator to the container for simultaneously vibrating the container and the placing of a hollow mold core member having a plurality of apertures therein in the middle of the container for the gas bubbles to escape as a result of the vibration of the cement mixture in a vacuum.

6 Claims, 4 Drawing Sheets

FIG. 4
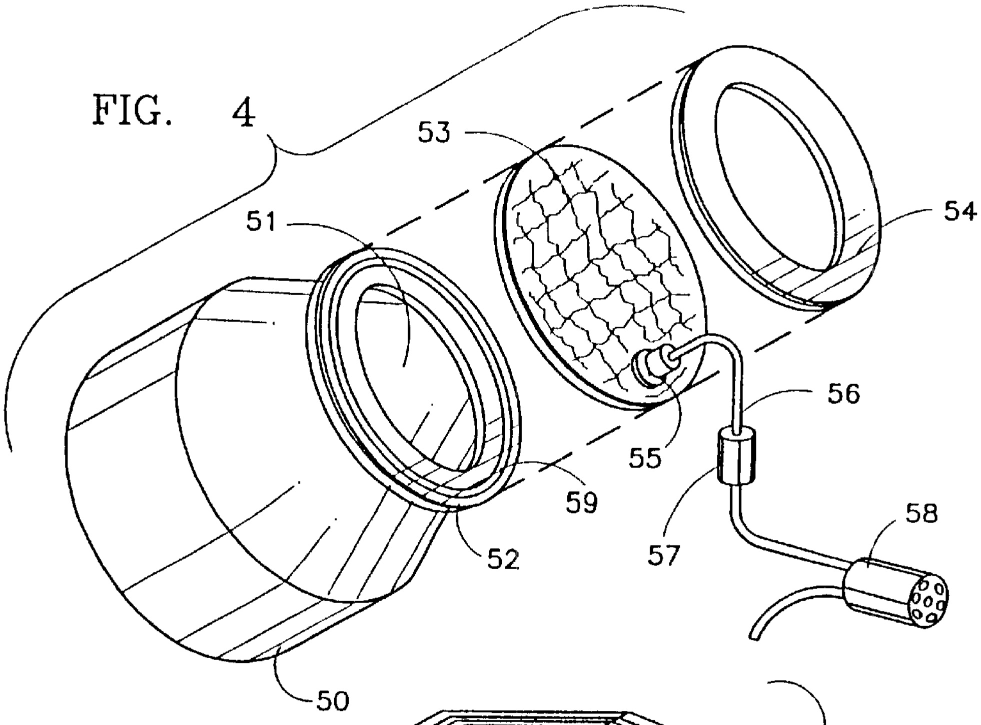
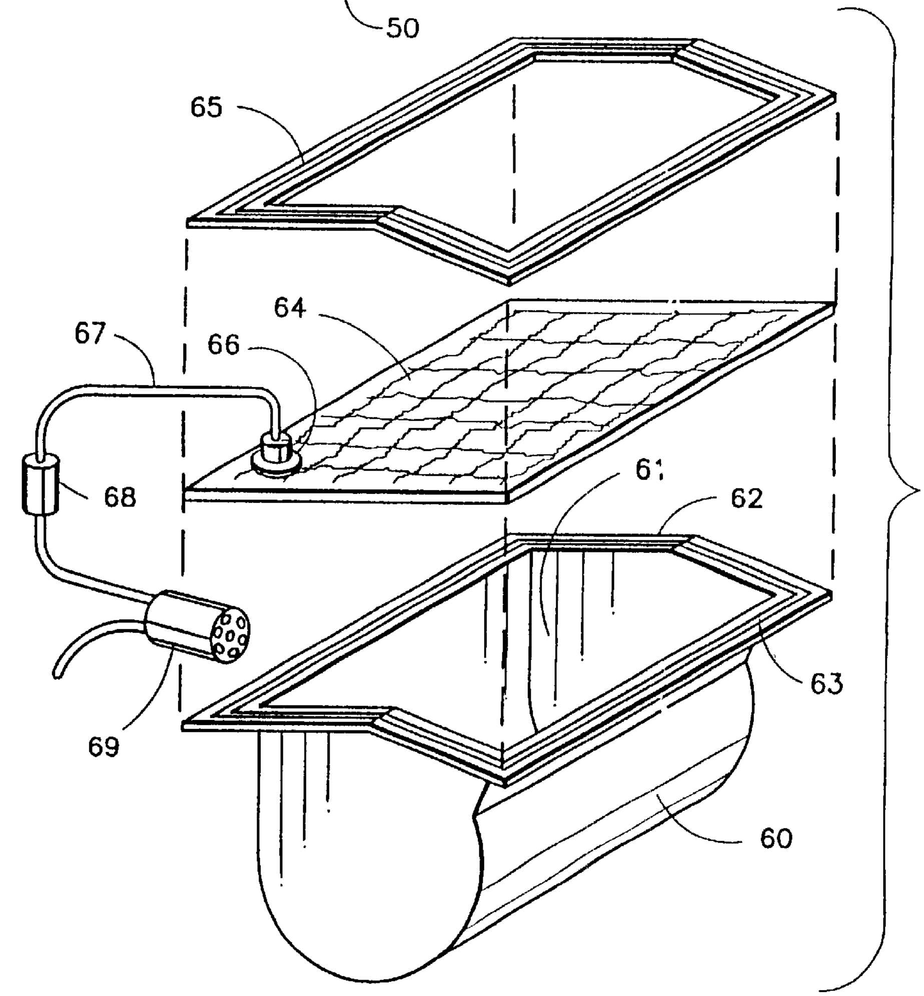
FIG. 5

VACUUM MOLDING PROCESS

This is a division of patent application Ser. No. 08/723,183, filed Sep. 27, 1996 now U.S. Pat. No. 5,932,256.

BACKGROUND OF THE INVENTION

The present invention relates to a vacuum molding process and apparatus which utilizes a flexible molding cover or bag to place a vacuum onto a container filled with an uncured cement mixture.

In the past, it has been common to mold various types of products out of a cement or concrete which includes the making of a mixture of a predetermined Portland cement which may include the addition of gravel or lightweight components, such as polymer beads or the like. The mixture is typically cured by mixing a predetermined amount of water with the cement mixture and mixed in a mixer which may be a cement truck with a rotating mixer. Typically in a molding operation, the cement is mixed at the location of the molding operation and the mixed cement is placed in the mold and cured to form a predetermined molded product. The product can include sculptures, containers, balustrades, or other building components and can be molded with standard cement or concrete mixture or lightweight concrete having lightweight particles incorporated into the cement to reduce the weight of the molded product.

It has been suggested in the past to vibrate the mold once the cement or other molding material has been placed therein to get entrained air or other gases out of the cement material to remove air pockets and bubbles from the molded product. This is commonly done by placing the filled mold with the uncured mixed cement onto a vibrating table in which the vibration causing the bubbles to rise in the cement to suggested to attach a vibrator clamp to a mold and a vibrator to the clamp to vibrate the mold during the molding operation to remove gases and to compact the molded mixture. A centrifugal molding or casting machines have been used which result in the rapid rotation of the mold loaded with a molding material. Another method of removing bubbles is to place the mold on a vacuum chamber or the like and place a vacuum on the area around the mold for withdrawing bubbles from the mold.

In contrast to these prior art systems, the present invention uses an ordinary flexible plastic film which may be reinforced with crinkling or with fibers and in which a vacuum pump is connected thereto through a vacuum hose. The plastic sheet material can be rigid or flexible transparent or opaque and formed in such a fashion that would be concave and conform with the flow of vacuum. The plastic film is easily clamped over conventional containers, such as a wheelbarrow or mixing container, with a sealing clamp and may also include a vacuum bag for placing over a mold. The mold can be placed on a vibrating table or having a vibrating clamp attached thereto with a vibrator for vibrating the mold in a partial vacuum for the removal of gas bubbles from the molded material.

One prior art U.S. patent can be seen in the Lee U.S. Pat. No. 4,990,082, for a vibrator with suction apparatus which illustrates a vibrator for architectural or civil engineering and uses a reciprocating or rotating vibrator along with a suction system which is integrally formed with the vibrating means and has at least one suction member to be attached to the forming mold. The suction system is such to enable an airtight connection between the vibrator and the forming molds and is substantially in the shape of a disc with an air passage formed therein to operate with an air pump to produce a low pressure area in the disc body. The Gayso U.S. Pat. No. 4,796,686, is a centrifugal casting machine with venturi actuated vacuum venting. A centrifugal force casting machine develops a vacuum as it travels through the air on the spinning arms of a casting machine in order to evacuate unwanted gases from the casting mold. The Abbott U.S. Pat. No. 3,323,188, is an apparatus for molding and compacting hollow concrete products including a pulsating water vibrator. The Emmons U.S. Pat. No. 2,610,040, is an operating mechanism for a vibrating table used in molding a product. The Dubbs et al. U.S. Pat. No. 2,603,850, is a method and apparatus for molding concrete products. The Lake U.S. Pat. No. 2,386,961, is another apparatus for molding tubular concrete products which utilizes both pressure and a vacuum in connection with the molding of the product.

The present application includes a suction apparatus which uses a flexible plastic film which may be in the form of a plastic bag or a plastic cover which can be placed over conventional or non-conventional containers, such as placing the mold in a plastic bag and sealing the opening to the bag. A plastic film, such as sold by Film Technology, Inc. under U.S. Pat. No. 5,129,813, can be used in the present invention. A vacuum is then placed in the area under the cover to place a vacuum on the uncured cement mixture in the container or mold which consists in the removal of bubbles and may also include a means for simultaneously vibrating the mold or cement mixture. The system can be made to fit a wide variety of different molds as well as molding operations and unusual containers.

SUMMARY OF THE INVENTION

A system for placing a vacuum on a container for a cement or molding mixture includes a container for holding the cement which has an opening for adding or removing cement. A flexible polymer film cover is sized to cover at least the open portion of the container and has a vacuum hose coupling attached thereto which connects to a vacuum hose connected to a vacuum pump for drawing a vacuum between the cover and the container. Attaching means, such as a clamping bracket, are provided for removably attaching the flexible polymer cover to the container. A vapor trap is attached in the vacuum line for capturing vapor removed by the vacuum applied to the container. A mold may have a hollow mold core member placed in the center of the mold which has a plurality of apertures therein and which has the uncured cement placed therearound for producing the vacuum in the center of the molded part during the curing of the concrete. The mold may have a vibrator clamp and a vibrator attached thereto for simultaneously vibrating the mold while producing a vacuum to remove gas bubbles from the cement. A method may include selecting a flexible polymer cover for covering a selected cement container and having a vacuum hose coupled thereto and at least partially filling a container with a cement mixture and removably attaching the polymer cover to the partially filled cement container and placing a vacuum on the cement mixture. The process can also include connecting a vibrator to the mold container for simultaneously vibrating the mold and the placing of a hollow mold core member having a plurality of apertures therein in the middle of the mold for the gas bubbles to escape from the vibration and vacuum.

BRIEF DESCRIPTION OF THE DRAWINGS

Other objects, features, and advantages of the present invention will be apparent from the written description and the drawings in which:

FIG. 4 is an exploded view of a vacuum apparatus for a cement mixing drum;

FIG. 5 is an exploded view of another vacuum apparatus for FIG. 4;

DESCRIPTION OF THE PREFERRED EMBODIMENTS

Figure 1:
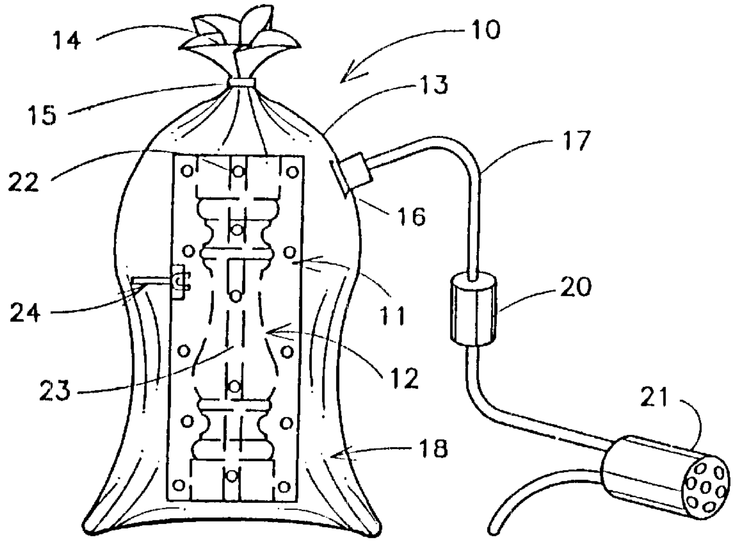
FIG. 1 is a side elevation of a molding apparatus in accordance with the present invention.

Referring to the drawings and especially to FIG. 1, a vacuum molding apparatus 10 has a mold 11 therein for molding a cement or concrete product, such as a balustrade 12, therein. The molding apparatus includes a flexible polymer film or a plastic bag 13 for covering the mold 11 and which has an opening 14 so that the mold 11 can be placed inside the bag and then the bag sealed with a tie 15. The flexible polymer bag 13 is made of a heavy plastic which may be reinforced with reinforcing fibers, or alternatively, may be crinkled to give additional stiffness and strength to the flexible polymer film. The polymer bag 13 has a vacuum hose coupling 16 attached therethrough for attaching a vacuum hose 17 from outside the bag 13 coupled to the inside of the bag 18. The coupling 16 can be a quick connect type coupling so that the hose 17 can be connected and disconnected rapidly. The vacuum hose 17 has a vapor trap 20 therein for capturing any water or other liquid vapor being drawn from the inside of the bag 18 by the placement of a vacuum on the interior of the bag 13. A vacuum pump 21 draws a vacuum on the hose 17 to place a predetermined vacuum within the bag 13. The bag 13 has a mold 11 for molding a cement or concrete type product which may be a mixture of Portland cement mixed with an aggregate material and water to form a concrete baluster 12 or can be filled with a mixture of Portland cement and a lightweight aggregate, such as foamed polymer beads or the like. Additional additives and water are mixed and the mixture poured in the mold 12 where the mixture is cured. In the mold 12, a hollow central or core tube 22 is placed in the middle of the mold 12 and has a plurality of apertures 23 therein. The core 23 can be made of a metal or polymer material and can be left in the molded product. When a vacuum is placed on the interior of the bag 13, the vacuum also draws gases that may be escaping from the curing mixture during the curing process. By having the open core 22 with the apertures 23, the vacuum extends into the center of the curing concrete and assists the escape of bubbles captured in the concrete mix over the entire length of the molded product 12. The vibrator clamp 24 is attached to the mold 11 and allows a vibrator mechanism to be attached thereto and may extend through an opening in the bag 13 or, alternatively, the vibrator can be clamped onto the vibrator clamp 24 around the plastic bag 13 for vibrating the mold 11. The vibration of the mold 11 encourages the escape of trapped gas bubbles, which are mostly air from the curing cement mixture, within the mold 11 while placing a vacuum within the bag 13 evacuates the air from tube 22 mounted in the middle of the mold. This substantially increases the escape of trapped air and gases from the cement mixture to enhance the strength of the final molded product, such as the baluster 12. The use of a flexible plastic covering for enclosing the mold 12 and having a vacuum hose connector 16 therethrough results in the collapsing of the flexible bag 13 onto the mold but does not prevent the vacuum being placed on the curing cement and removes only limited amounts of water and other vapor as the gas escapes from the curing cement. Vapors are trapped in the vapor trap 20.

Figure 2:
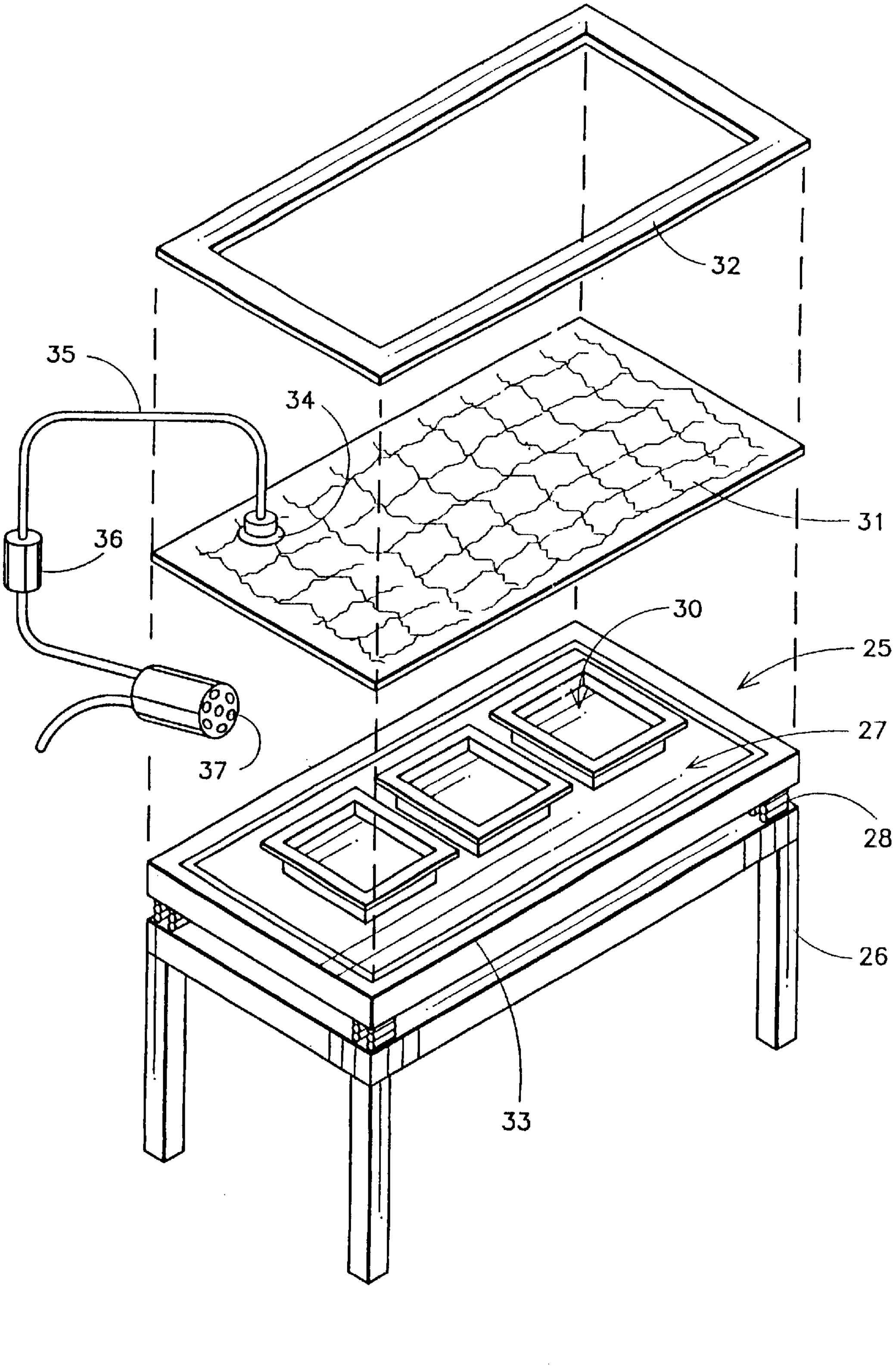
FIG. 2 is an exploded view of a second embodiment of a molding apparatus of FIG. 1.

Turning to FIG. 2, an alternative embodiment utilizes a vibrating table 25 having legs 26 supporting a vibrator table portion 27 under a plurality of springs 28. The vibrating mechanism vibrates the tabletop portion, which has a plurality of mold pans 30 thereontop. A flexible reinforced polymer cover 31 may have reinforcing fibers therein or be of a wrinkled plastic surface to reduce clinging of the cover once the vacuum is placed on the covered area. The plastic film 31 has a table clamping flange 32 which clamps onto the edges of the plastic film 31 and onto the vibrating table edge 33 to seal the plastic film 31 over the molding vibrating table 25. The plastic film 31 has a quick connect vacuum hose coupling 34 therethrough connected to a vacuum hose 35 which in turn is connected through a vapor trap 36 and to a vacuum pump 37. Once an airtight seal is made with the film 31 over the vibrator table 25 tabletop with the raised edges 33, a vacuum is placed on the area under the plastic film cover 31 and on the tabletop 27 with the pan molds 30 therein. Simultaneously, the vibrator table 25 can be actuated to vibrate the products being molded of a cementuous or other molding material. A vacuum is placed between the cover 31 and table 27 and assists in the removal of air from the molding mixture within the molding pans 30 to enhance the strength of the molded product.

Figure 3:
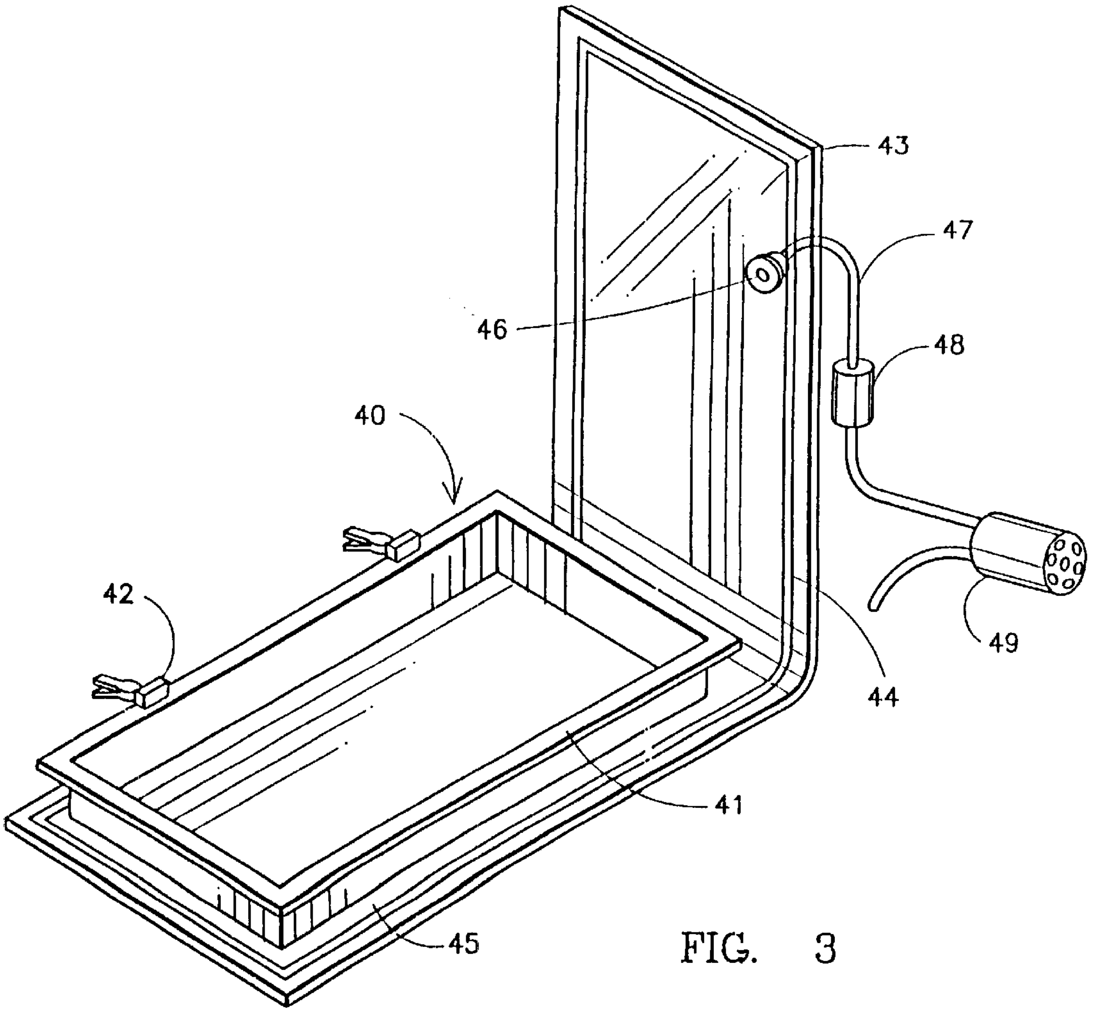
FIG. 3 is a perspective view of a third embodiment of the apparatus of FIG. 1.

FIG. 3 is another embodiment that illustrates a tilt-up wall form 40 for molding a wall section and having flanges 41 therearound with clamp-on vibrators 42 clamped onto the flanges 41. The flexible polymer cover film 43 is wrapped entirely around the tilt-up wall form 40 where its bonding edge 44 can be used to give a vacuum seal to the folded sheet edge 45 or to the flanges 41 of the container 40. A quick connect vacuum hose coupling 46 through the polymer material 43 connects a vacuum hose 47 and has a vapor trap 48 along with a vacuum pump 49. The tilt-up wall form 40 is vibrated with the vibrators 42 while simultaneously placing a vacuum thereon for the removal of air bubbles trapped within the cement mixture forming the wall in the wall form 40.

FIGS. 4–8 illustrate a vacuum system for placing a vacuum onto a container of an uncured cement mixture. In FIG. 4, a mixer drum has an opening 51 thereinto and a flange 52 around the opening 51. A wrinkled or reinforced flexible polymer or plastic film cover 53 is shaped to cover the opening 51 over the flanges 52. A clamping ring 54 clamps to the flange 52 over the edges of the flexible plastic cover 53. A quick connect coupling 55 connects a vacuum hose 56. The vacuum hose 56 has a vapor trap 57 therein and is connected to the vacuum pump 58. The mixer drum 50 can have the flexible polymer cover 53 attached to the cover after it is loaded with a cement mixture, such as the mixing of Portland cement, water, aggregate, or lightweight aggregate. The clamp 54 clamps over the flange 52 and onto a sealing O-ring 59. The O-ring 59 can of course be replaced with a double side sealing tape. The mixer drum 50 can be rolled back and forth for mixing the cement therein while placing a vacuum in the container 50 for the removal of gas bubbles trapped within the cement mixture.

FIG. 5 is a similar cement mixing apparatus which has a mixer 60 having an arcuate base and an open top 61 having a flange 62 with a sealing O-ring or the like 63 round the flange 62. The wrinkled plastic film 64 is cut to the shape of the perimeter flange 62 for fitting thereon and a clamping fixture 65 clamps the cover film 64 over the mixer 60 once the mixer container 60 has been loaded with a cement mixture. The plastic film 64 has a quick connect coupling 66 therethrough connecting a vacuum hose 67 through a vapor trap 68 to a vacuum pump 69. Once the container 60 is loaded with the desired cement or molding mixture and the plastic film 64 is clamped over the opening 61, the vacuum is placed on the container 60, which may be rocked back and forth for mixing the cement.

Figure 6:
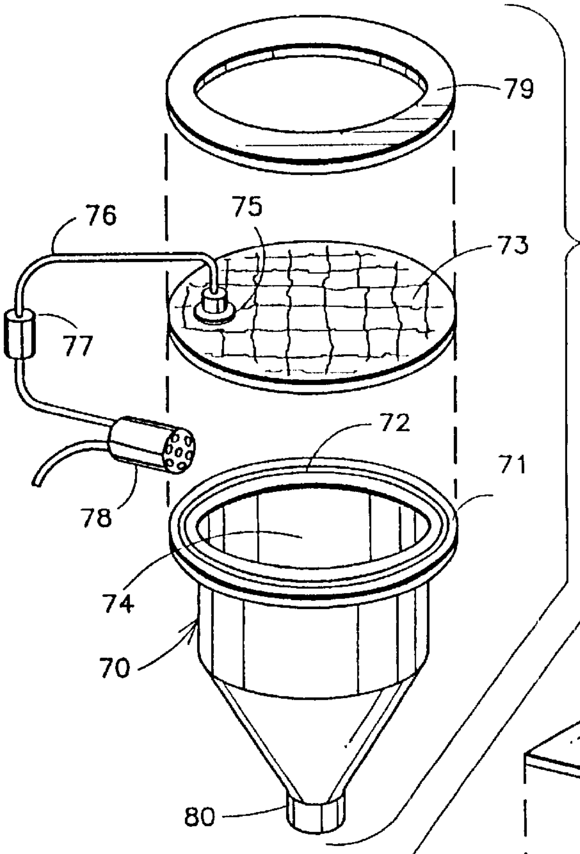
FIG. 6 is an exploded perspective of a vacuum apparatus for a cement hopper.

Turning to FIG. 6, a cement hopper 70 has a surrounding flange 71 having a sealing O-ring 72 therearound. A crinkled or reinforced plastic film 73 is shaped to fit onto the flange 71 to cover the opening 74 and a quick connect coupling 75 connects through the flexible plastic cover 73 to a vacuum mold 76 and through a vapor trap 77 to a vacuum pump 78. A clamping fixture 79 clamps the film 73 onto the flange 71 to give an airtight seal over the cement hopper 70 to assist in removing gases from the cement mixture while in the hopper 70. The hopper has an opening 80 which allows the removal of the cement mixture within the cement hopper 70.

Figure 7:
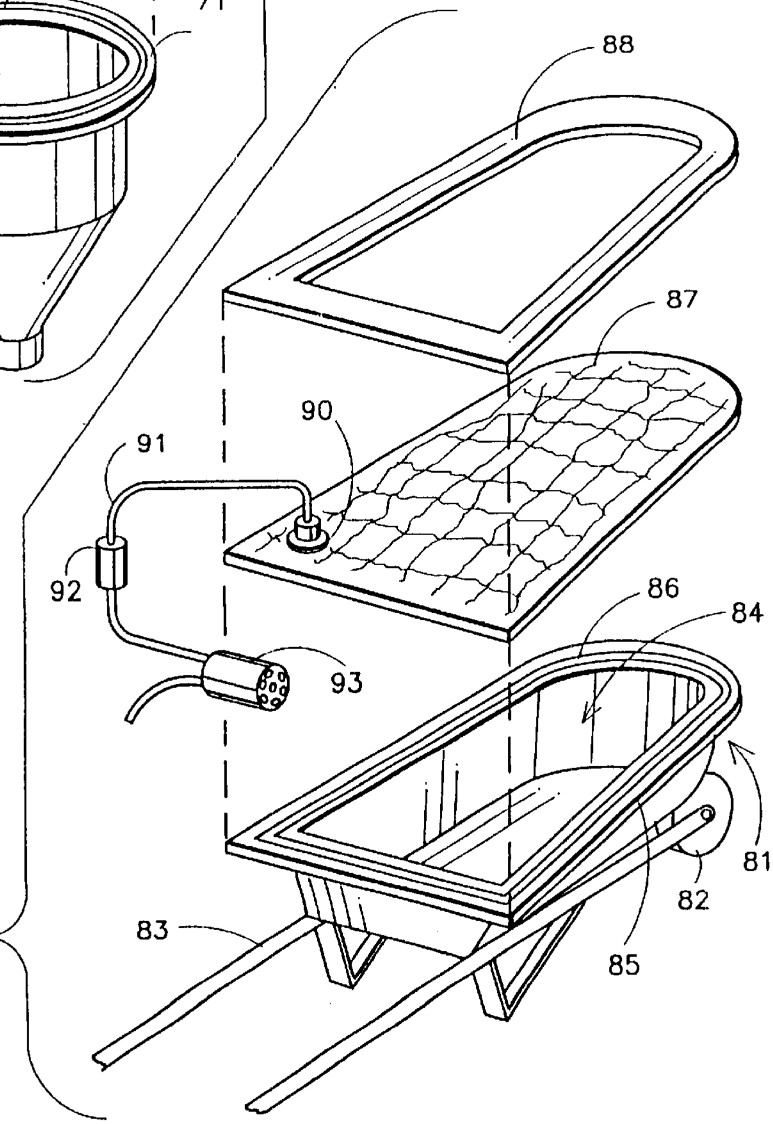
FIG. 7 is an exploded perspective of a vacuum apparatus for a wheel barrow.

FIG. 7 shows an additional embodiment where a wheelbarrow 81 has a wheel 82 and handles 83 along with the container portion 84 having a flange 85 therearound. Flange 85 has been fitted with an O-ring or other sealing material 86 and a flexible plastic cover 87 has been shaped to fit over the wheelbarrow flange 85. A clamping fixture 88 is shaped to fit on top of the flange 81 and onto the perimeter of the polymer cover 87 to seal the cover 87 over the wheelbarrow container 84. A quick connect vacuum hose 90 connects a vacuum hose 91 through a vapor trap 92 to a vacuum pump 93. Thus, a cement mixture can be loaded onto the wheelbarrow 81 and the flexible plastic 87 clamped thereover to give an airtight seal and a partial vacuum placed within the sealed container 84. The wheelbarrow 81 can then be rocked or vibrated to assist in the removal of trapped gas particles within the mixture in the container 84.

It should be clear at this time that a molding apparatus and process has been provided which allows the placement of an inexpensive vapor seal covering a mold to allow a vacuum to be placed on a cementuous or other molded material being curing while simultaneously allowing the mold to be vibrated. It should also be clear that a flexible polymer cover can be designed for easy placement over various types of cement or mixing materials to enhance the removal of gases, such as air, from the materials during the mixing and curing of the materials. However, the present invention is not to be considered as limited to the forms shown which are to be considered illustrative rather than restrictive.

I claim:

1. A vacuum molding process comprising the steps of:

selecting a cement mixer drum having an open portion;

selecting a flexible polymer cover sized to at least cover said open portion in said selected cement mixer drum, said selected polymer cover having a vacuum hose coupling attached thereto and a vacuum hose removably attached to said vacuum hose coupling and a vacuum pump connected to said vacuum hose for drawing a vacuum therein;

at least partially filling said cement mixer drum with an uncured cement and water mixture;

removably attaching said selected polymer cover to said cement mixer drum open portion;

actuating said vacuum pump to place a vacuum on said cement and water mixture to thereby remove gases therefrom;

actuating said vibrator to vibrate said selected cement mixer drum whereby a cement mixer drum can have a vacuum and vibration placed thereon to remove gases from said cement and water mixture.

2. A vacuum molding process in accordance with claim 1 in which the step of selecting a cement mixer drum includes selecting a cement mixer drum having at least one vibrator clamp attached thereto and attaching said selected vibrator thereto.

3. A vacuum molding process in accordance with claim 1 in which the step of selecting a flexible polymer cover includes selecting a reinforced flexible polymer cover.

4. A vacuum molding process in accordance with claim 1 in which the step of selecting a cement mixer drum includes selecting a wheelbarrow.

5. A vacuum molding process in accordance with claim 1 in which the step of selecting a flexible polymer cover having a vacuum hose coupling attached thereto includes a vacuum hose quick release coupling.

6. A vacuum molding process in accordance with claim 1 in which the step of selecting a flexible polymer cover includes selecting a flexible polymer cover bag.

* * * * *